United States Patent [19]

Clerc et al.

[11] 4,449,125

[45] May 15, 1984

[54] MATRIX DISPLAY DEVICE

[75] Inventors: Jean F. Clerc, Meylan; Jacques Robert, Ville d'Avray, both of France

[73] Assignee: Commissariat a l'Energie Atomique, Paris, France

[21] Appl. No.: 336,190

[22] Filed: Dec. 31, 1981

[30] Foreign Application Priority Data

Jan. 5, 1981 [FR] France ................ 81 00049

[51] Int. Cl.³ ........................................ G09G 3/36
[52] U.S. Cl. .............................. 340/752; 340/779; 340/784; 350/333
[58] Field of Search ............. 340/752, 771, 775, 779, 340/807, 773, 774, 778, 784; 350/333, 336; 315/169.1; 313/584, 585

[56] References Cited

U.S. PATENT DOCUMENTS

| | | | |
|---|---|---|---|
| 3,666,981 | 5/1972 | Lay | 340/778 |
| 3,719,940 | 3/1973 | Lay et al. | 340/771 |
| 3,863,087 | 1/1975 | Holz | 340/775 |
| 4,099,855 | 7/1978 | Wiebey et al. | 350/333 |
| 4,146,876 | 3/1979 | Arellano et al. | 350/333 |
| 4,277,786 | 7/1981 | Waldron | 340/784 |

FOREIGN PATENT DOCUMENTS

| | | | |
|---|---|---|---|
| 2926402 | 1/1981 | Fed. Rep. of Germany | 340/775 |
| 55-60917 | 5/1980 | Japan | 350/333 |

*Primary Examiner*—Gerald L. Brigance
*Attorney, Agent, or Firm*—Oblon, Fisher, Spivak, McClelland & Maier

[57] ABSTRACT

A matrix display device having two groups of row electrodes and a process for the control thereof. This device is constituted by two insulating walls made from a material having several zones distributed in matrix-like manner, a first group of p rows of parallel electrodes covering one of the walls and a second group of q columns of parallel electrodes covering the other wall. A zone $x_i y_j$ is defined by the overlap of row $x_i$ and column $y_j$ in which i varies from 1 to p and j from 1 to q. The said device also comprises a third group of p rows of electrodes, identical to the first group and placed on the second group, while being electrically insulated from the latter by an insulating layer.

7 Claims, 3 Drawing Figures

MATRIX DISPLAY DEVICE

BACKGROUND OF THE INVENTION

The present invention relates to a matrix display device comprising two groups of row electrodes and to the process for controlling this device. It is used in opto-electronics and more particularly in the control of liquid crystal cells used more specifically as converters of electrical data into optical data, in the real time processing of optical images, in the construction of coloured filters particularly usable in colour television and in analog displays.

More specifically, the invention relates to a matrix display device comprising a display cell constituted by two transparent insulating walls and a material comprising a plurality of zones distributed in matrix-like manner, with a first group of p rows of parallel electrodes positioned on one of the two insulating walls and a second group of q columns of parallel electrodes positioned on the other insulating wall. The rows and columns cross one another. An area $x_i y_j$ of the material is defined by the overlap region between row $x_i$ (in which i is an integer which can assume all values between 1 and p) and column $y_j$ (in which j is an integer between 1 and q). The bands formed by the columns and rows are such that they can carry signals suitable for the excitation of the material having an optical property dependent on said excitation. This system of electrodes is called a cross-bar system.

Numerous devices of this type are known using, for example, as the sensitive material a liquid crystal film and for which the excitation is electrical. The invention applies particularly advantageously to such devices, but also applies in more general terms to any cross-bar device incorporating a material, whereof one optical property can be modified by means of an electrical excitation. The material can be solid, liquid, amorphous or crystalline. The optical property can be opacity, refractive index, transparency, absorption, diffusion, diffraction, convergence, rotatory power, birefringence, intensity reflected in a given solid angle, etc.

A process for the control of such known display devices consists, for example, in the case of a liquid crystal cell where excitation is of an electrical nature of the application of an alternating voltage $V_x$ to row $x_i$ and a zero voltage to the other rows and the application to the columns $y_j$ of alternating voltages $V_{yj}$ of the same duration and frequency as voltage $V_x$, but which are dephased with respect to the latter by a quantity $\phi_{ji}$. This phase displacement $\phi_{ji}$ makes it possible to vary the intensity of the signal to be displayed, i.e. makes it possible to obtain different grey levels.

Such a control process is described in French Patent No. 2,279,123, filed on Feb. 5, 1974 by the present Applicant and entitled "Process for the control of an optical characteristic of a material and analog imager utilizing this process".

This control process applied to devices like those described hereinbefore has the disadvantage of leading to differential accumulation defects.

BRIEF SUMMARY OF THE INVENTION

The invention relates to a display device with two groups of row electrodes and its control process making it possible to obviate the aforementioned disadvantage by reducing the accumulation effects, no matter what the displayed image.

The present invention specifically relates to a matrix display device comprising a display cell constituted by two transparent insulating walls and by a material incorporating a plurality of zones distributed in matrix-like manner and having a first group of p rows of parallel electrodes placed on one of the insulating walls and a second group of q columns of parallel electrodes placed on the other insulating wall, the rows and columns crossing one another, a zone $x_i y_j$ being defined by the region of the material covered by row $x_i$ in which i is an integer such that $1 \geq i \geq p$, and by column $y_j$ in which j is an integer such that $1 \geq j \geq q$, and means making it possible to supply excitation signals to the electrodes, said material having an optical property dependent on said excitation, wherein the device also comprises a third group of p rows of parallel electrodes, whose orientation is identical to that of the first group and placed on the second group of electrodes, whilst being electrically insulated from said second group by an insulating layer, so that the material is inserted between the first group of electrodes and the third group of electrodes and is in contact with said first and third groups of electrodes.

According to a preferred embodiment of the display device according to the invention, the material is a liquid crystal film, whose optical property is dependent on the electric field applied thereto, said excitation signals being electrical voltages.

According to a preferred embodiment of the invention, the third group of electrodes is in the form of a matrix of point electrodes, each of the latter being provided with a switch being able either to join it to a constant potential conductor common to all the point electrodes of the same row in the group, or to electrically insulate it, the control of said switch being effected by a control conductor common to all the point electrodes in the same row of the group.

The present invention also relates to a process for the control of a matrix display device and defined hereinbefore.

This process for controlling an optical property of zone $x_i y_j$ of the material of the type in which the zones belonging to a same row $x_i$ are sequentially analysed in time, comprises the application of a potential $-V_1$ to row $x_i$ of the first group of electrodes and of a potential $-V_o$ to the other rows of said group, and the application to column $y_j$ of the second group of electrodes of a potential $V_2$, which is a function of the value of the optical property desired in zone $x_i y_j$, row $x_i$ of the third group of electrodes being electrically insulated and the other rows of said group being raised to a potential $V_0'$.

According to a variant of the process according to the invention, the q zones of the same row $x_i$ of the first group of electrodes are simultaneously controlled by simultaneously applying to each column of the second group of electrodes a potential $V_2$, which is a function of the optical property desired at the intersection.

BRIEF DESCRIPTION OF THE DRAWINGS

The invention is described in greater detail hereinafter relative to non-limitative embodiments and with reference to the attached drawings, wherein.

DETAILED DESCRIPTION OF THE PREFERRED EMBODIMENTS

For reasons of clarity, the description refers to a display device, whose material is a liquid crystal film and the optical property of the latter is dependent on the electrical field applied thereto. As stated hereinbefore, the invention can be applied in a much more general manner, but as the liquid crystal devices are at present well known and widely used, it is preferable for the description to relate to this particular example.

Figure 1:
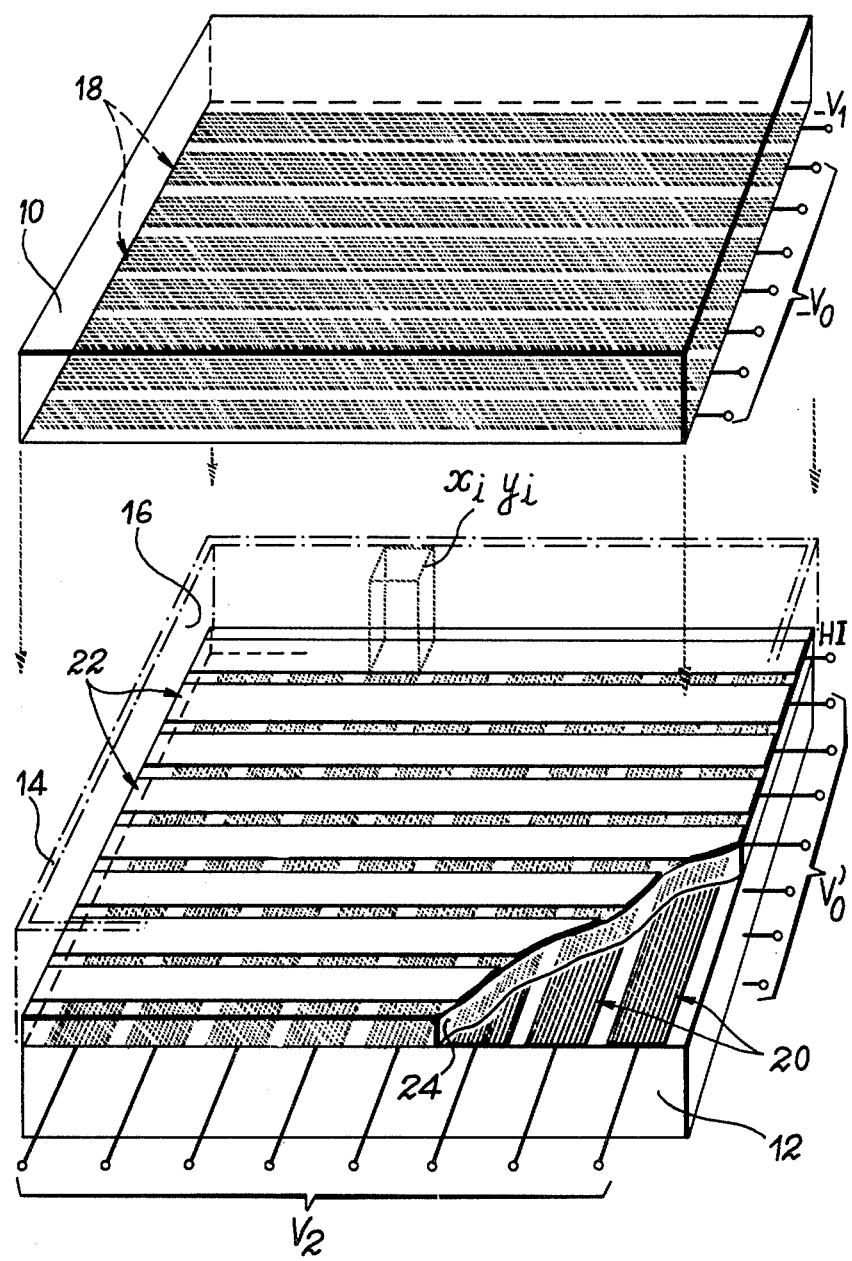
FIG. 1 illustrates, diagrammatically, a first embodiment of a display device according to the invention.

FIG. 1 shows a cross-bar display cell having two generally transparent walls 10 and 12 positioned on either side of a shim 14, made from an insulating material and defining a volume 6 which, when the cell is fitted, is occupied by the material, whereof an optical property is controlled, e.g. a liquid crystal film. A first group of p rows of electrodes 18 is placed on the wall 10 and a second group of q columns of electrodes 20 is placed on wall 12, each being constituted by a series of parallel, transparent, conductive bands made, for example, from indium oxide and designated $x_i$ for the rows and $y_j$ for the columns. Thus, the useful surface of the liquid crystal is broken down into a mosaic of zones corresponding to the overlap zones of the two groups of electrodes, each zone corresponding to the overlap of two bands $x_i$ and $y_j$ and which can therefore be designated $x_i y_j$.

The excitation of one zone, i.e. the control of an optical property of the liquid crystal contained in this zone, takes place by the application to electrodes $x_i$ and $y_j$ of voltages supplied by not shown power supply sources leading to the appearance of an electric field within the liquid crystal. Thus, an image is made to appear on the cell by defining it point by point and by successively sensitizing the zones according to known sequential control principles utilizing the considerable optical effect reduction time induced in the liquid crystal.

According to the invention, the displayed cell also comprises a third group of p rows of electrodes 22, whose orientation is the same as that of the first group and which is placed on the second group of electrodes 20 and insulated therefrom by an insulating layer 24 of limited thickness and high dielectric constant made e.g. from silica or alumina. Like the two other groups of electrodes, the electrodes of the third group 22 are transparent and are made e.g. from indium oxide. Due to the existence of this third group of electrodes, the liquid crystal film is inserted between the first group of electrodes 18 and the third group of electrodes 22 and is in contact with said first and third groups of electrodes.

According to the invention, for exciting the optical property of zone $x_i j_y$ of the material, i.e. in order to obtain a display of the corresponding point of the display device, a potential of $-V_1$ is applied to row $x_i$ of the first group of electrodes and a potential $-V_0$ to the other rows of said first group, whilst a voltage $V_2$ is applied to column $y_j$. With regards to the third group of electrodes, row $x_j$ of said group is insulated, i.e. the not shown control surface is placed under high impedance (H.I) and the other rows of this group are raised to a potential $V_0'$.

To bring about the display of a complete row $x_i$ of the matrix display device, potential $V_2$ corresponding to the optical state desired at the intersection is simultaneously applied to each column of the second group of electrodes.

Figure 2:
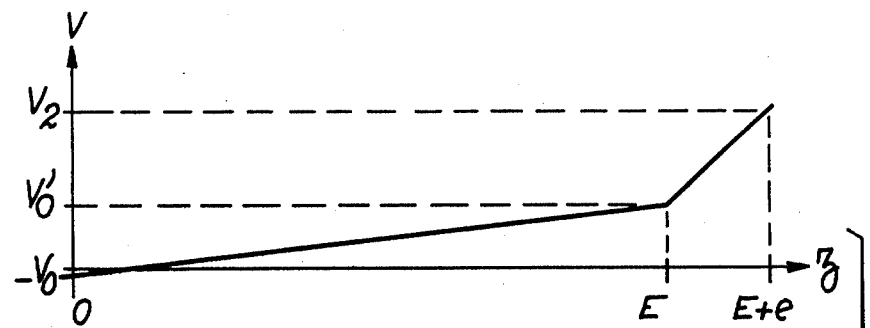
FIG. 2 shows the distribution of the potential between the different groups of electrodes of the device of FIG. 1.
Figure 2:
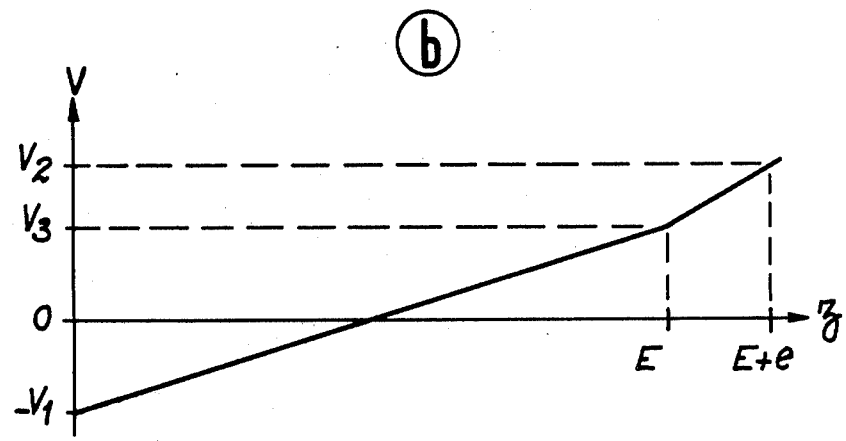

FIG. 2 shows the distribution of the potential between the first group of electrodes and the second group of electrodes. On the abscissa is plotted the distance z from the first group of electrodes, whilst the corresponding potential is plotted on the ordinate.

The display material between row $x_i$ of the first and third groups of electrodes has a thickness E, so that z varies from 0 to E. The insulating layer 24 between row $x_i$ of the third group of electrodes and column $y_j$ of the second group of electrodes has a thickness E, so that z varies from E to E+e.

When the rows of the first group of electrodes are raised to potential $-V_0$, i.e. said rows are not selected (curve a) and the rows of the third group of electrodes are raised to $V_0'$, a constant voltage $V_0' + V_0$ appears at the terminals of the display material no matter what potential is applied to the columns of the display device. Therefore, no matter what zone of the display material is excited, the adjacent displayed or undisplayed points receive strictly equal interference voltages, whose value can be modulated.

When row $x_i$ of the first group of electrodes is raised to potential $-V_1$, i.e. said row is selected (curve b) and column $y_j$ is at potential $V_2$, voltage $V_2 + V_1$ is distributed between the insulating layer and the display material, row $x_i$ of the third group of electrodes being electrically insulated. In this case, potential $V_3$ represents the potential at row $x_i$ of the third group of electrodes.

The voltage seen by the display material, i.e. $V_3 + V_1$ must be as high as possible to obtain contrasted display, so that insulating layer 24 must have a limited thickness compared with that of the display material and/or a dielectric constant higher than that of the display material. Thus, by writing the continuity of the electric field on row $x_i$ of the third group of electrodes knowing that $\epsilon_m$ and $\epsilon_i$ respectively represent the dielectric constant of the display material and of the insulating layer, the following equation is obtained:

$$\frac{(V_3 + V_1)\epsilon_m}{E} = \frac{(V_2 - V_3)\epsilon_i}{e}$$

Therefore, if it is desired that potential $V_3$ differs only slightly from potential $V_2$, $\epsilon_m/E$ must be much lower than $\epsilon_i/e$.

The above-described distribution of the potentials is only strictly realised if it is considered that the different zones of an electrode in the third group, corresponding to the different points of the display device, are liable to assume potentials which are independent of one another. This would be incorrect if these electrodes were very conductive because they would be equipotential at all times. By the very nature of these thin indium oxide electrodes, this assumption is correct that the time of applying the addressing potentials of a row and the operation is indeed as described hereinbefore if the row addressing signals are sufficiently short.

However, if these signals are of long duration, the potential at each point of the row would tend to evolve towards a uniform value, which is a function of the levels applied to the column electrodes and a mean value is obtained between these levels. Thus, the excitation in the optical state of each point of a row will depend on the excitation of the other points of a row (in a variable manner according to the conductivity of the row electrodes). Moreover, between two successive rows the equilibrium potential differs for a given potential applied to the column, so that the optical state of the intersection point will differ. These phenomena lead to a deterioration of the contact.

Figure 3:
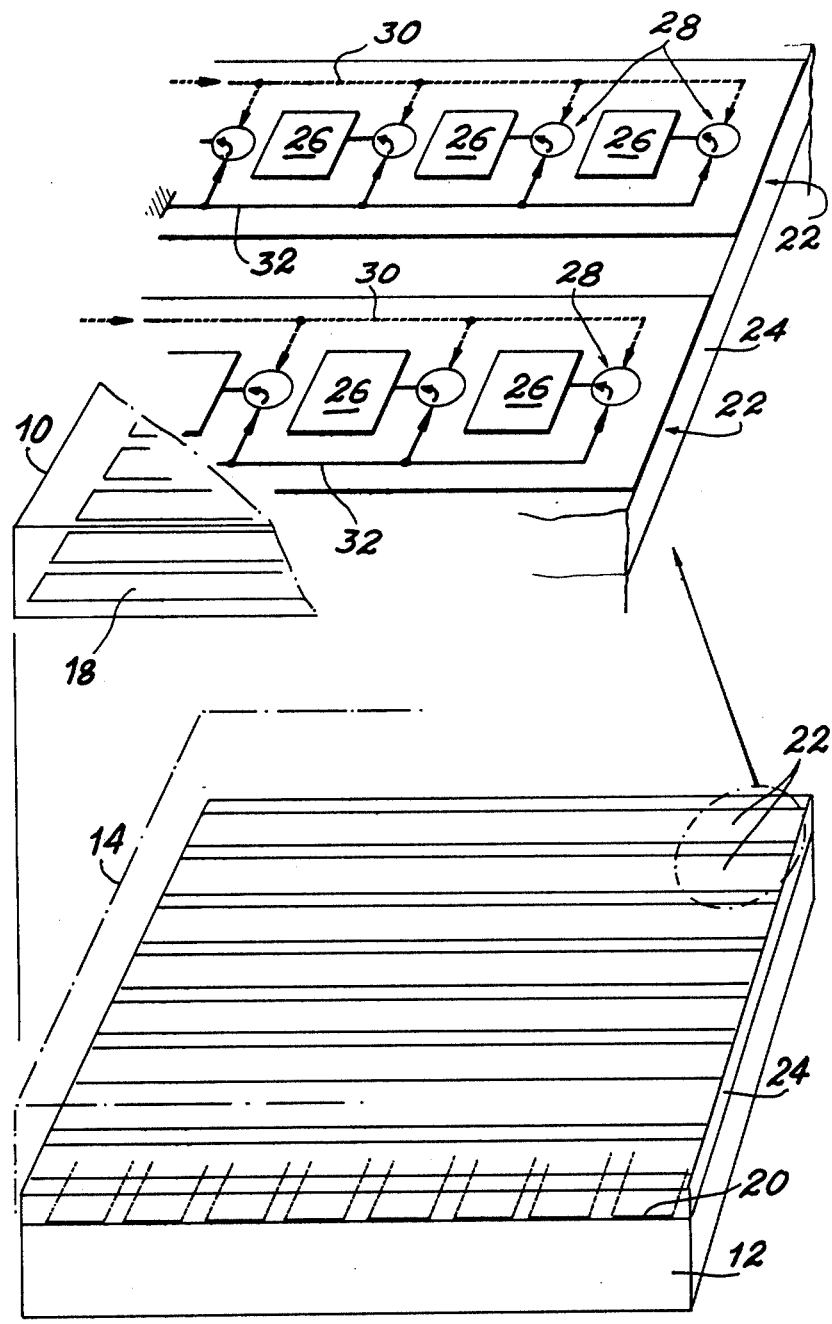
FIG. 3 illustrates, diagrammatically, a second embodiment of display device according to the invention.

To obviate this disadvantage, the invention proposes an improvement, illustrated in FIG. 3. In this improvement, each row of the third group is constituted by a separate point electrode system 26. Each point electrode 26 is provided with a control switch e.g. in the form of a thin layer transistor. All the control switches 28 of the same row are controlled by the same control conductor 30. All the control switches of the same row make it possible to connect all the point electrodes 26 of the same row to a common conductor 32 at constant potential (when the row is not addressed) or to electrically insulate them (when the row is addressed).

In a display device using a liquid crystal cell, e.g. of the nematic type, the phenomenon used is the collective orientation of the molecules of said crystal parallel to the electrodes when said crystal is exposed to an electric field. The phenomenon used in such a device is described in French Patent 2,279,123.

To prevent any disturbance in the liquid, due more particularly to ion transits (polarization phenomenon), it is possible to reverse the voltage applied to the terminals of the material. To solve this problem, it is possible to use alternating voltages for controlling the optical property of the material.

The display device described hereinbefore also has the advantage of permitting an unlimited multiplexing level of the signals applied to the electrodes when addressing the different rows of the device and without disturbing the display of the already displayed points, the limitation of the multiplexing level being linked with the differential accumulation effects.

The process for the control of a display device according to the invention can be used in the case of a binary display and the voltage $V_2$ can then assume two and only two different values. However, it is obvious that this control process can also be applied to an analog display in which case voltage $V_2$ can assume any value between these two levels.

In addition, it is possible to envisage applications of the invention other than to row and column imagers. It does not pass beyond the scope of the invention if, for the excitation in general manner of a particular zone of a liquid crystal cell, or a material having comparable optical properties, two electrodes are arranged on either side of said zone. During the timer interval when this zone is effectively excited, a signal is applied to the first of these electrodes (addressing electrodes) which is transmitted to the sensitive material, e.g. the liquid crystal, despite the presence of the second electrode (screen electrode), which is then insulated. During the remainder of the time when the sensitive material essentially maintains the same properties in the particular zone considered, the two electrodes of this zone are then at a fixed potential. As a result, the parasitic excitation is constant and the zone is removed from the influence of external potentials.

What is claimed is:

1. A matrix display device comprising a display cell constituted by two transparent insulating walls and by a material incorporating a plurality of zones distributed in matrix-like manner and having a first group of p rows of parallel electrodes placed on one of said insulating walls and a second group of q columns of parallel electrodes placed on the other of said insulating walls, said p rows and said q columns crossing one another, a zone $x_i y_j$ being defined by the region of the material covered by row $x_i$ in which i is an integer such that $1 \leq i \leq p$, and by column $y_j$ in which j is an integer such that $1 \leq j \leq q$, and means making it possible to supply excitation signals to the electrodes, said material having an optical property dependent on said excitation signals, wherein the device also comprises a third group of p rows of parallel electrodes, whose orientation is identical to that of the first group and placed on the second group of electrodes, whilst being electrically insulated from said second group by an insulating layer, so that the material is inserted between the first group of electrodes and the third group of electrodes and is in contact with said first and third groups of electrodes wherein the third group of electrodes is in the form of a matrix of point electrodes, each of said point electrodes being provided with a switch being operable to join said each point electrode to a constant potential conductor common to all the point electrodes of the same row in the group or to electrically insulate said each point electrode, with the control of each said switch being effected by a control conductor common to all the point electrodes in the same row of said third group.

2. A display device according to claim 1, wherein the material is a liquid crystal film, whose optical property is dependent on the electric field applied thereto, the excitation signals being voltages.

3. A display device according to claims 1 or 2, wherein the groups of electrodes are made from a transparent conductive material.

4. A display device according to claim 3, wherein the transparent conductive material is indium oxide.

5. A display material according to claim 1, wherein the insulating layer is chosen from the group including alumina and silica.

6. A process for the control of a matrix display device according to claim 1, wherein for the purpose of controlling the optical property of the material of zone $x_i y_j$, a potential of $-V_1$ is applied to row $x_i$ of the first group of electrodes and a potential $-V_0$ to the other rows of said group and to column $y_j$ of the second group of electrodes is applied a potential $V_2$, the first group of electrodes being associated with said third group of p rows of electrodes placed on the second group of electrodes and electrically insulated therefrom, row $x_i$ of the third group of electrodes being insulated and the other rows of said group being raised to a potential $V_0'$, the material being inserted between the first group of electrodes and the third group of electrodes and in contact with said first and third groups of electrodes.

7. A control process according to claim 6, wherein a complete row $x_i$ of the first group of electrodes is simultaneously controlled by simultaneously applying potential $V_2$ to each column of the second group of electrodes.

* * * * *